Oct. 24, 1939.  W. F. ALLER  2,177,399

MEASURING INSTRUMENT

Filed June 16, 1938

INVENTOR
Willis Fay Aller
BY Maréchal & Noe
ATTORNEY

Patented Oct. 24, 1939

2,177,399

UNITED STATES PATENT OFFICE 2,177,399

MEASURING INSTRUMENT

Willis Fay Aller, Dayton, Ohio, assignor to The Sheffield Gage Corporation, Dayton, Ohio, a corporation of Ohio Application June 16, 1938, Serial No. 213,972

9 Claims. (Cl. 33—147)

This invention relates to measuring instruments and more particularly to measuring gages for accurately determining size relationships such as the height or diameter of a measured part with respect to a standard size or dimension.

One object of the invention is the provision of a measuring instrument having an indicator controlling mechanism operated by a plunger or the like which is rotatably adjustable for fine adjustments in setting and which is axially movable for the operation of the indicator, the plunger being supported and held by a holder which is axially movable therewith and which is yieldingly mounted on the instrument frame.

Another object of the invention is the provision of an instrument of the character mentioned in which the plunger is mounted on the frame by means of a plurality of parallel spring blades which provide for parallel movement of the plunger in the direction of its axis.

Other objects and advantages of the invention will be apparent from the following description, the appended claims and the accompanying drawing in which—

Figure 4:
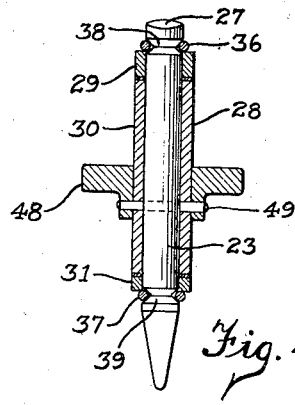
Fig. 4 is a vertical section through the plunger and holder, taken on the line 4—4 of Fig. 1.
Figure 3:
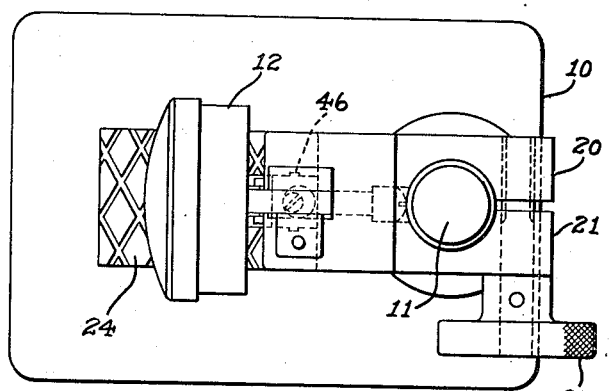
Fig. 3 is a top plan view of the instrument.
Figure 2:
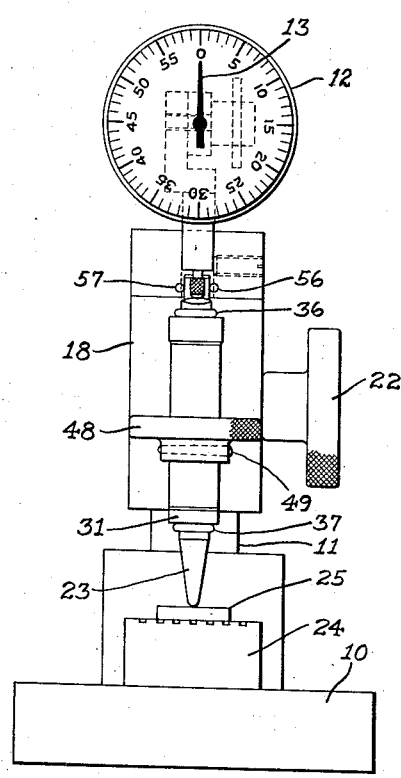
Fig. 2 is a front elevation of the instrument.

Referring more particularly to the drawing by reference numerals, 10 designates the base and 11 the column of a measuring instrument such as a gage adapted to accurately measure the amount that a specimen tested might be too large or too small with respect to a standard size. The indicating mechanism itself is contained in a housing 12 and may be of any suitable character, such as disclosed in Patent No. 2,139,251 granted December 6, 1938, so that the indicating pointer 13 is responsive to the longitudinal movement of an operated member 14 which is axially movable in the boss 15 extending from the lower side of the housing 12. The rear of the housing 12, as shown, is provided with a post 16 which is adjustably fixed in a frame 18, by means of a set screw 19 which is threaded in the frame and engages the post 17 so as to normally hold these parts rigidly secured together.

The frame 18 is preferably mounted for vertical movement along the column 11, and includes clamping sides 20 and 21 that are slightly spaced apart so that a clamping member 22 which is threaded in the clamping side 20 may be turned manually to secure the support 18 at any desired height along the column 11. In this way the work contacting plunger 23 of the instrument may be arranged substantially the desired distance above the anvil 24 to engage work pieces 25 at different heights.

If the specimen is slightly oversize, the plunger 23 will be moved upwardly a slight distance, transmitting a corresponding upward movement to the operated member 14, the gage pointer 13 showing the amount the specimen is out of size although on a greatly magnified scale.

The means for supporting the plunger 23 is such as to permit the rotational setting of the plunger to be quickly and readily changed by the operator to vary the setting of the indicating means so that the indicating pointer will read zero for a specimen of the exact size being measured. The upper end of the plunger is provided with an inclined or cam face 27, preferably a flat face having an inclination of only a few thousandths of an inch in the diameter of the plunger, this inclination being shown on an exaggerated scale in the drawing. The lower end of the operated member 14 of the indicating mechanism bears on the inclined face 27 at a point eccentrically displaced from the plunger axis. Assuming the plunger is held against axial movement, it will be apparent that rotational movements of the plunger will cause a slight up or down movement of the operated member 14, to vary the setting of the pointer 13.

Figure 5:
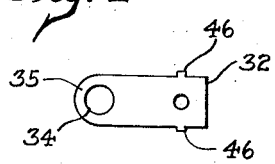
Fig. 5 is a detail view of one of the spring blades by which the holder is mounted.

The plunger 23 is mounted in a holder 28 which includes axially related holder portions 29, 30 and 31 and a plurality of spaced parallel members 32 and 33 which extend preferably transversely of the plunger axis and support the plunger for axial movement. These members, as shown, are spaced flat metal spring blades, one of which is shown in Fig. 5, and as will be apparent from that figure, at one end of the blade is an opening 34 large enough to fit over the plunger, the annularly extending portion 35 of the spring blade being clamped between the holder portions 29 and 30 in a yielding manner by means of split spring rings 36 and 37 which engage grooves 38 and 39 in the plunger, it being understood that the outer end 40 of the spring blade 33 is held between the holder portions 31 and 30. The distance between the grooves 38 and 39 is such that the spring rings 36 and 37 respectively bear against the upper side of the groove 38 and the lower side of the groove 39 and yieldingly urge the holder portions 29 and 31 towards one another because of the contracting tendency of the split rings. In accordance with this construction it will be apparent that the plunger is held against any play or lost motion with respect to the holder portions, and that the plunger is so mounted that it can move in the direction of its own axis with the holder portions 29, 30 and 31.

The opposite ends of the spring blades 32 and 33 are securely clamped in position on the support 18, the latter having a block 42 to which the blades are clamped by means of upper and lower clamp plates 43 and 44 which engage the upper and lower sides respectively of the spring blades 32 and 33, and which are held in place by means of suitable screws 45. The block 42 is provided with grooves into which laterally projecting ends 46 of the spring blades fit so that the spring blades cannot turn about the axis of the screws 45.

Figure 1:
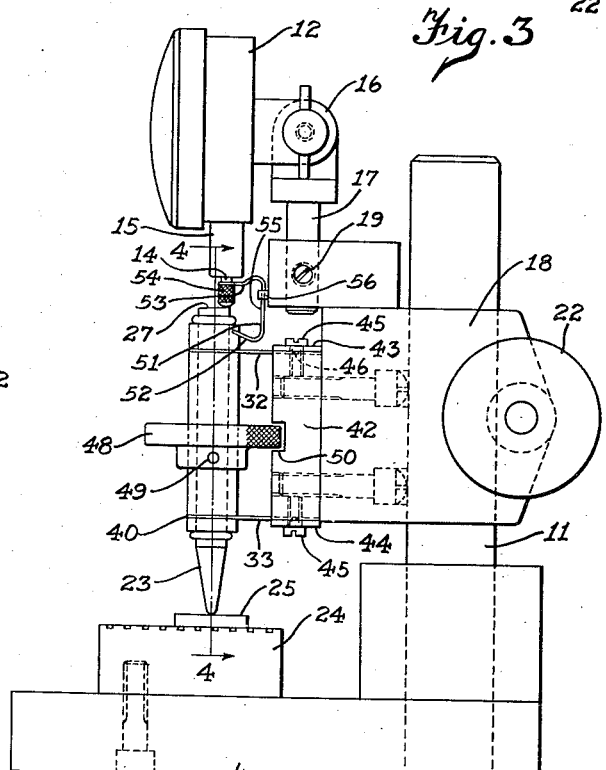
Fig. 1 is a side elevation of a measuring instrument embodying the present invention.

In the normal position of the plunger when the plunger is set for a work piece of given size, the spring blades 32 and 33 will be straight and will extend transversely of the plunger axis in the position shown in Fig. 1 if the work piece is of the proper size, and in this position of the plunger a zero reading will be indicated by the pointer 13. However if a workpiece is slightly undersize, the plunger will be positioned slightly lower than that shown in Fig. 1, and the spring blades 32 and 33 will be very slightly flexed although the position of the plunger axis will be maintained parallel to itself at all times.

Surrounding the holder member 30 is an adjusting ring 48 that can be manually turned to rotate the plunger about its own axis. This ring 48 is secured to the holder member 30 and also to the plunger 23 by means of a pin 49 which extends through these parts with a tight fit with all of them so that when the ring 48 is turned the plunger will be moved correspondingly in order to vary the initial setting of the instrument. The peripheral portion of the ring 48 extends into a groove 50 provided in the spring supporting block 42, with a normal suitable clearance between the upper and lower side of the ring 48 so that up and down movements of the plunger are permitted without restraint. However the ring 48 prevents excessive upward or downward movements of the plunger and forms a stop that prevents undue flexing of the spring blades and thus protects the blades and also protects the instrument itself from injury. It will be apparent that the holder in which the plunger is mounted may be rotated at any time by the ring 48 or by grasping the holder portion 30 itself, as the yielding clamping engagement of the spring blades with the upper and lower sides of the holder member 30 may be overcome by a manual force although it is sufficient to hold these parts securely against any movement in the normal operation of the instrument during a gaging operation.

Spring means are preferably provided in order to maintain the lower end of the operated member 14 in yielding engagement with the upper end of the plunger 23. Thus, as shown in Fig. 1, a curved spring member 51 is arranged so as to yieldingly urge these two parts together, the lower end of the spring 51 having an end portion 52 which fits in a slot provided in the holder portion 29, the upper end of the spring member having an arm 53 which bears downwardly against an enlargement 54 on the lower end of the operated member 14. The vertically extending portion 55 of the spring is guided between laterally opposed guide pins 56 and 57 which project from the support 18 which freely permit vertical movements of the spring but keep the spring from turning.

While the form of apparatus herein described constitutes a prefered embodiment of the invention, it is to be understood that the invention is not limited to this precise form of apparatus, and that changes may be made therein without departing from the scope of the invention which is defined in the appended claims.

What is claimed is:

1. In a measuring instrument of the character described, a support, an adjusting plunger adapted for movement in the direction of the plunger axis, indicating means operated by axial movement of said plunger, said plunger also being rotatable about its own axis and having cam means at one end thereof to vary the setting of said indicating means as the plunger is rotated, and means including a plurality of spaced parallel members each fulcrumed on said support and each having an end portion extending around said plunger and mounting said plunger at a distance from the fulcrum locations for rotational and axial movements.

2. In a measuring instrument of the character described, a support, a work engaging adjusting plunger adapted for movement in the direction of the plunger axis, indicating means operated by axial movement of said plunger, said plunger also being rotatable about its own axis and having cam means at one end thereof to vary the setting of said indicating means as the plunger is rotated, and means including a plurality of spaced parallel spring blades each secured at one end thereof to said support and mounting said plunger at the other end thereof for rotational and axial movements.

3. In a measuring instrument of the character described, a support, gaging mechanism on said support, an elongated gaging element adapted to be operated by the work and having an operative connection to said gaging mechanism, a holder supporting said gaging element for rotation about its own axis and movable with said element in the direction of said axis, a hand wheel fixed to said element for rotating the same, said element having means for adjusting the relationship of said mechanism with respect thereto as the element is rotated, and spring means secured at one end to said support and engaged at its opposite end with said holder for yieldingly mounting said holder on said support for rectilinear movement in the direction of the length of said element.

4. In a measuring instrument of the character described, a support, gaging mechanism on said support, an elongated gaging element adapted to be operated by the work and having an operative connection to said gaging mechanism, a holder supporting said gaging element for rotation about its own axis and movable with said element in the direction of said axis, said element having means for adjusting the relationship of said mechanism with respect thereto as the element is rotated, spring means secured at one end to said support and engaged at its opposite end with said holder for yieldingly mounting said holder on said support for rectilinear movement in the direction of the length of said element, and spring means acting axially on said element between the element and the holder for yieldingly restraining rotational movements of said element.

5. In a measuring instrument of the character described, a support, an axially movable adjusting plunger, indicating means operated by axial movement of said plunger, a holder adapted to move with said plunger in the direction of the plunger axis and supporting said plunger for rotation about its own axis to vary the setting of the indicating means, and spaced spring blades each secured at one end to said support and engaged at the other end with said holder to mount the holder and plunger for movement parallel to the plunger axis, said holder comprising axially related holder portions and means clamping said holder portions and spring blades yieldingly together and frictionally restraining rotational movements of said holder and plunger.

6. In a measuring instrument of the character described, a support, an adjusting plunger adapted for movement in the direction of the plunger axis, indicating means operated by axial movement of said plunger, said plunger also being rotatable about its own axis and having cam means at one end thereof to vary the setting of said indicating means as the plunger is rotated, a plunger holder including a hand operated member for rotating said plunger, means fixing said member and plunger together, means on said support engageable with opposite sides of said member to limit axial movements of the plunger, and a pair of parallel spring blades extending transversely of the plunger axis and each secured at one end thereof to said support and engaged at the other end thereof with said holder to mount the plunger for movement parallel to the plunger axis.

7. In a measuring instrument of the character described, a support, an adjusting plunger, a holder adapted to move with said plunger in the direction of the plunger axis, indicating means including an operated member operated by axial movement of said plunger, said plunger being mounted for rotation with said holder and having means at one end thereof to vary the setting of said indicating means as the plunger is rotated, spring blades each secured at one end thereof to said support and engaged at the other end with said holder to mount the plunger for movement parallel to the plunger axis, means yieldingly restraining rotation of said holder, and spring means yieldingly maintaining the operated member of the indicating means engaged with the end of said plunger.

8. In a measuring instrument of the character described, a support, an adjusting plunger, a sleeve fixed to said plunger, indicating means on said support including an operated member operated by axial movement of said plunger, said plunger having means at one end thereof to vary the setting of said indicating means upon rotational movements of the plunger, spring blades each secured at one end thereof to said support and engaged at the other end with the ends of said sleeve to mount the plunger for movement parallel to the plunger axis, collars rotatably mounted on said plunger at opposite ends of said sleeve, and spring means yieldingly holding said collars against said sleeve and spring blades and engaging said plunger to yieldingly restrain rotation of said plunger.

9. In a measuring instrument of the character described, a support, gaging mechanism on said support, a gaging plunger adapted to be operated by the work and having an operative connection to said mechanism, said plunger being rotatable about its own axis and having means to vary the setting of the indicating means as the plunger is rotated, a plunger supporting block movable with said plunger in the direction of the plunger axis in a gaging operation and a pair of parallel spring blades each secured at one end thereof to said support and connected at the other end thereof to said supporting block for yieldingly mounting said block on said support for rectilinear movement in the direction of the length of said plunger.

WILLIS FAY ALLER.